US009749365B2

(12) United States Patent
Forsberg et al.

(10) Patent No.: US 9,749,365 B2
(45) Date of Patent: Aug. 29, 2017

(54) HOLD ANNOUNCEMENT CONFIGURATION

(75) Inventors: Mikael Forsberg, Tyresö (SE); Jörgen Axell, Danderyd (SE); Lennart Norell, Älvsjö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 315 days.

(21) Appl. No.: 14/390,516

(22) PCT Filed: Apr. 3, 2012

(86) PCT No.: PCT/EP2012/056093
§ 371 (c)(1),
(2), (4) Date: Oct. 3, 2014

(87) PCT Pub. No.: WO2013/149654
PCT Pub. Date: Oct. 10, 2013

(65) Prior Publication Data
US 2015/0120832 A1    Apr. 30, 2015

(51) Int. Cl.
*G06F 15/16*     (2006.01)
*H04L 29/06*     (2006.01)

(52) U.S. Cl.
CPC ...... *H04L 65/1096* (2013.01); *H04L 65/1016* (2013.01); *H04L 65/1063* (2013.01); *H04L 65/1069* (2013.01); *H04L 65/1083* (2013.01)

(58) Field of Classification Search
CPC .................. H04L 65/1096; H04L 29/0638
USPC ........................................ 709/204, 200, 223
See application file for complete search history.

(56) References Cited

U.S. PATENT DOCUMENTS

2004/0266399 A1* 12/2004 Simpson ........... H04M 3/42017
                                                                455/412.1
2008/0080506 A1   4/2008 Kelly et al.
2010/0238841 A1*  9/2010 Long .................. H04M 3/4283
                                                                370/259

FOREIGN PATENT DOCUMENTS

| CN | 1810028 A   | 7/2006 |
| CN | 101111086 A | 1/2008 |
| CN | 101459738 A | 6/2009 |
| CN | 101511058 A | 8/2009 |
| CN | 101848517 A | 9/2010 |

OTHER PUBLICATIONS

Notification of Transmittal of the International Search Report and the Written Opinion of the International Searching Authority, or the Declaration for counterpart Application No. PCT/EP2012/056093, mailed Dec. 18, 2012, 6 pages (Continued)

*Primary Examiner* — El Hadji Sall
(74) *Attorney, Agent, or Firm* — Nicholson De Vos Webster & Elliott LLP

(57) ABSTRACT

A method and apparatus for managing a HOLD announcement in a communication network. At an Application Server, AS, a message is received from a user terminal, the message comprises of an indicator, specifying whether the AS should provide a HOLD announcement in the event of a change in direction of a media stream between the user terminal and a further node during a session. The AS stores the indicator in a memory. Upon determination that a change in direction of the media stream has occurred, the AS determines, from the indicator, whether or not to provide the HOLD announcement to the further node.

20 Claims, 7 Drawing Sheets

(56) References Cited

OTHER PUBLICATIONS

"3rd Generation Partnership Project; Technical Specification Group Core Network and Terminals; Communication Hold (Hold) using IP Multimedia (IM) Core Network (CN) subsystem; Protocol specification (Release 10)," 3GPP TS 24.610 V10.0.0 (Mar. 2011), 22 pages, 3GPP Organizational Partners.
"3rd Generation Partnership Project; Technical Specification Group Core Network and Terminals; Extensible Markup Language (XML) Configuration Access Protocol (XCAP) over the Ut interface for Manipulating Supplementary Services (Release 10)," 3GPP TS 24.623 V10.2.0 (Dec. 2011), 17 pages, 3GPP Organizational Partners.
Anonymous, "MMD Supplementary Services," 3rd Generation Partnership Project 2 "3GPP2", 3GPP2 X.P0055, Version: v0.07, Oct. 1, 2007, 70 pages.
Handley, et al., "SDP: Session Description Protocol," Jul. 2006, 44 pages, Network Working Group, Request for Comments: 4566, The Internet Society.
First Office Action and Search Report for China Application No. 201280071935.8, mailed Oct. 8, 2016, 10 pages.
"MMD Supplementary Services", 3GPP2 X.S0055-0 Version 1.0, 3GPP2, May 31, 2008, pp. 8-11.
"3rd Generation Partnership Project; Technical Specification Group Core Network and Terminals; Communication Hold (Hold) using IP Multimedia (IM) Core Network (CN) subsystem; Protocol specification (Release 11)", 3GPP TS 24.610 v11.0.0, Mar. 13, 2012, pp. 1-22.

* cited by examiner

HOLD ANNOUNCEMENT CONFIGURATION

CROSS-REFERENCE TO RELATED APPLICATIONS

This application is a National stage of International Application No. PCT/EP2012/056093, filed Apr. 3, 2012, which is hereby incorporated by reference.

TECHNICAL FIELD

The invention relates to providing a HOLD announcement in a communication network.

BACKGROUND

The IP Multimedia Subsystem (IMS) is the technology defined by the Third Generation Partnership Project (3GPP) to provide IP Multimedia services over mobile communication networks. IP Multimedia services provide a dynamic combination of voice, video, messaging, data, etc. within the same session.

FIG. 1 illustrates schematically how the IMS fits into the mobile network architecture in the case of a GPRS/PS access network (IMS can of course operate over other access networks). As shown in FIG. 1, the IMS includes a core network, 101, and a service network, 102. Call/Session Control Functions (CSCFs), 103, operate as Session Initiation Protocol (SIP) proxies within the IMS core network, and interface with other entities such as Breakout Gateway Control Functions (BGCFs), 104, and Media Resource Function Controllers (MRFCs), 105, amongst others. A Proxy CSCF (P-CSCF) is the first point of contact within the IMS for an SIP terminal; a Serving CSCF (S-CSCF) provides services to the subscriber; an interrogating CSCF (I-CSCF) identifies the correct S-CSCF and forwards to that S-CSCF a request received from an SIP terminal via a P-CSCF.

Situations may arise in which a user, participating in a communication session with another user, wishes to place the other user on hold. 3GPP has specified a Communication HOLD supplementary service in TS 24.610, where a user can put another user on HOLD by changing the direction of the media stream in an established communication as defined in chapter "4.5.2.1 Actions at the invoking UE." In such a case a User Equipment (UE) generates a new session description protocol (SDP) offer, in which the SDP offer contains an attribute specifying the desired change. If the direction of the media stream was initially set to "send and receive," it may be downgraded to "send only" by specifying a "sendonly" attribute in the SDP offer. If the direction of the media stream was initially set to "receive only," it may be changed to "inactive" by specifying an "inactive" attribute in the SDP offer. The user can later resume the communication by changing back the media direction. A "recvonly" SDP attribute is used when the stream was previously set to "inactive," and a "sendrecv" SDP attribute is used when the stream was previously set to "sendonly." However the latter attribute may be omitted, since "sendrecv" is the default.

Chapter "4.5.2.4 Actions at the AS of the invoking UE" of TS 24.610 states that it is a network option as to whether to provide an announcement towards the held user.

There may be circumstances in which it is undesirable to have a HOLD announcement provided by a network when the user changes a direction of the media stream. For example, the user may be participating in a media session, containing both video and audio streams, with another node in a terminating network. Due to bandwidth considerations the user may decide to stop receiving the video stream, but keep the audio stream. In such a case the user may specify that the video stream direction be changed from "send and receive," to "send only." In this example, the user would not want an Application Server (AS) to provide a HOLD announcement to the other node in response to this change in direction of the media stream.

A specification is defined for the use of withholding a HOLD announcement during a conference, and is given in TS 24.610, chapter 4.6.6. If a participant of a conference invokes the HOLD service, it is not desirable to provide an announcement to the conference. The AS configures a HOLD announcement when a request is made to change the direction of the media stream during a conference, and does not provide one to the held users when the request originates from the "focus," with the "focus" being the central point of control, authentication, and authorization of the conference.

The withholding of the HOLD announcement specified in TS 24.610 does not solve the problem of allowing a user to configure a HOLD announcement, which is to be implemented when the user makes a change to the direction of the media stream.

SUMMARY

It is an object of the invention to provide greater control to a user on whether or not a HOLD announcement is to be played when the user places a recipient on HOLD. According to a first aspect of the invention, there is provided a method of managing a HOLD announcement in a communication network. At an Application Server, AS, a message is received from a user terminal. The message includes an indicator, specifying whether the AS should provide a HOLD announcement in the event of a change in direction of a media stream between the user terminal and a further node during a session. The AS stores the indicator in a memory. Upon determination that a change in direction of the media stream has occurred, the AS determines, from the indicator, whether or not to provide the HOLD announcement to the further node. A change in the direction of the media stream can occur, for instance, when initially a first user is participating in a media session, containing both video and audio streams, with another user. Due to bandwidth considerations the first user may decide to stop receiving the video stream, but keep the audio stream. In such a case the first user would specify that the video stream direction be changed from "send and receive," to "send only". The user in this example would not want an AS to provide a HOLD announcement to the other user in response to this change in direction of the media stream. Therefore the invention solves this problem by providing the user with the option of selecting whether or not they wish that a HOLD announcement is to be provided.

As an option, the network is an IP Multimedia Subsystem, IMS, network.

As an option, the indicator is supplied to the AS using a Supplementary Service Code, SSC, at the start of the session.

As an alternative option, the indicator is supplied to the AS using an a-attribute in a Session Description Protocol, SDP, message.

As a further alternative option, the indicator is supplied to the AS using supplementary service data, SSD.

As an option, the change in the direction of the media stream is from a "send and receive" media stream, to a "send only" media stream.

According to a second aspect, there is provided an AS for managing a HOLD announcement in a communication network. The AS is provided with a receiver for receiving a message from a user terminal. The message comprises an indicator specifying whether the AS should provide a HOLD announcement in the event of a change in direction of a media stream between the user terminal and a further node during a session. The AS is also provided with a memory for storing the indicator and a processor for determining that a change in direction of the media stream has occurred. The processor is arranged to determine, from the indicator, whether or not to provide the HOLD announcement to the further node.

According to a third aspect, there is provided a method of operating a user terminal. A user utilises the user input, and inputs an indicator specifying whether an AS should provide a HOLD announcement in the event of a change in direction of a media stream during a session involving the user terminal. The user terminal can then transmit a message comprising the indicator to the AS.

According to a fourth aspect, there is provided a user terminal. The user terminal is provided with a user input device for receiving a user input. The user input includes an indicator specifying whether an AS should provide a HOLD announcement in the event of a change in direction of a media stream during a session involving the user terminal. The user terminal is also provided with a transmitter for transmitting a message including the indicator to the AS.

According to a fifth aspect, there is provided a computer program, comprising computer readable code which, when run on an AS, causes the AS to perform the method as described above in the first aspect.

According to a sixth aspect, there is provided a computer program, comprising computer readable code which, when run on a user terminal, causes the user terminal to perform the method as described in the third aspect.

According to a seventh aspect, there is provided a computer program product comprising a computer readable medium and a computer program as described above in either of the fifth or sixth aspects, wherein the computer program is stored on the computer readable medium.

DETAILED DESCRIPTION

The invention provides to a user a way of specifying whether a HOLD announcement in a communication network is to be provided when a change in a direction of a media stream occurs. It can sometimes be undesirable for a HOLD announcement to be played when the direction of the media stream is changed. An example of a change in direction of a media stream may occur when the user is participating in a media session, containing both video and audio streams, with another node in a terminating network. Due to bandwidth considerations the user may decide to stop receiving the video stream, but keep the audio stream. In such a case the user specifies that the video stream direction be changed from "send and receive," to "send only." The user in this example would not want an AS to provide a HOLD announcement to the other node in response to this change in direction of the media stream.

Figure 1:
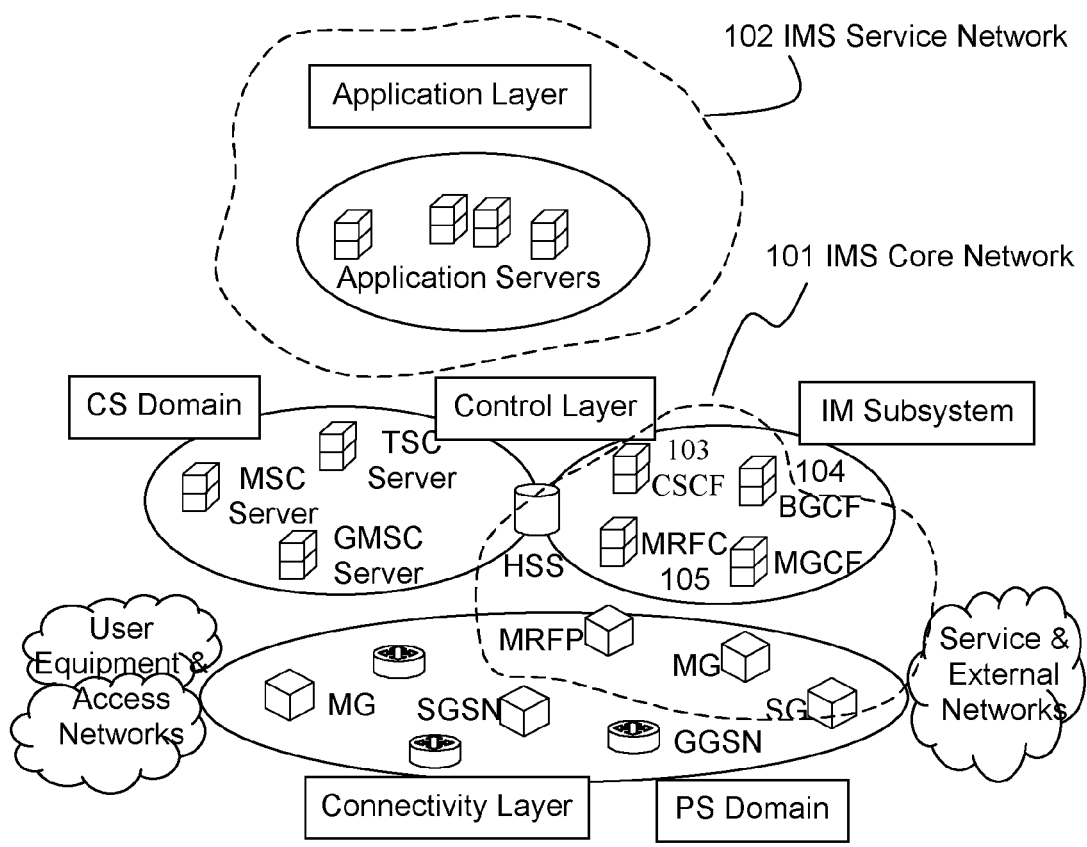
FIG. 1 illustrates schematically in a block diagram an IMS network in association with a mobile network architecture of a General Packet Radio Service (GPRS) access network.
Figure 2:
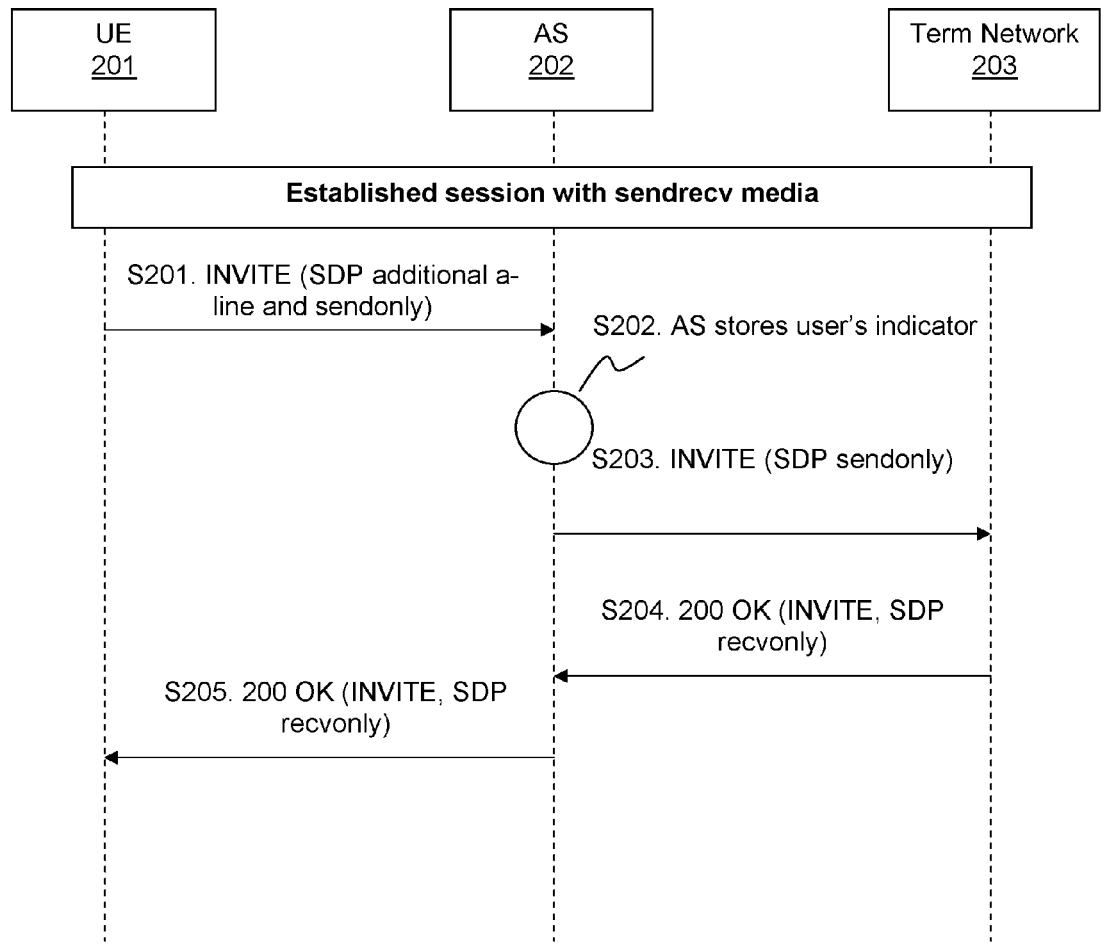
FIG. 2 is a signalling flow diagram illustrating an exemplary way of configuring a HOLD announcement.

A first exemplary embodiment is illustrated in FIG. 2. In this embodiment, a decision on whether or not to provide a HOLD announcement is configured by the user, achievable by utilising an a-attribute in a session description protocol (SDP) message. For example, two new additional a-lines can be defined as, "a=play-announcement" and "a=no-announcement", specifying that an announcement is to be provided, or not respectively.

The session's media stream is initially set to "send and receive."

S201. A user equipment (UE) 201 makes a request to change the media flow between itself and another node 203 in a terminating network from "send and receive" to "send only." This is achieved by sending an INVITE towards the other node 203, wherein the SDP message includes an "a=sendonly" attribute. The SDP also comprises an indicator specifying the user's settings regarding a HOLD announcement. This is in the form of the additional a-lines, "a=play-announcement" or "a=no-announcement" for example.

S202. The AS 202 receives the INVITE associated with the request to change the direction of the media stream, which also includes the indicator relating to whether a HOLD announcement is to be provided at the other node in the event of a change in the direction of the media stream. In this embodiment the indicator is in the form of the additional a-attribute, and is stored by the AS 202.

S203. The INVITE is forwarded on towards the other node 203. The AS can also provide or withhold a HOLD announcement to the other node, based on the contents of the indicator.

S204. Upon receiving the INVITE, the other node 203 sends a 200 OK response towards the UE 201 via the AS 202, wherein the 200 OK response contains an SDP message requesting that the media stream be set to "receive only."

This embodiment allows the user to specify whether a HOLD announcement is to be provided during a session in which a change in the direction of the media stream occurs. The embodiment allows the user to configure their desired setting during the session, by including an a-attribute in the SDP.

Figure 3:
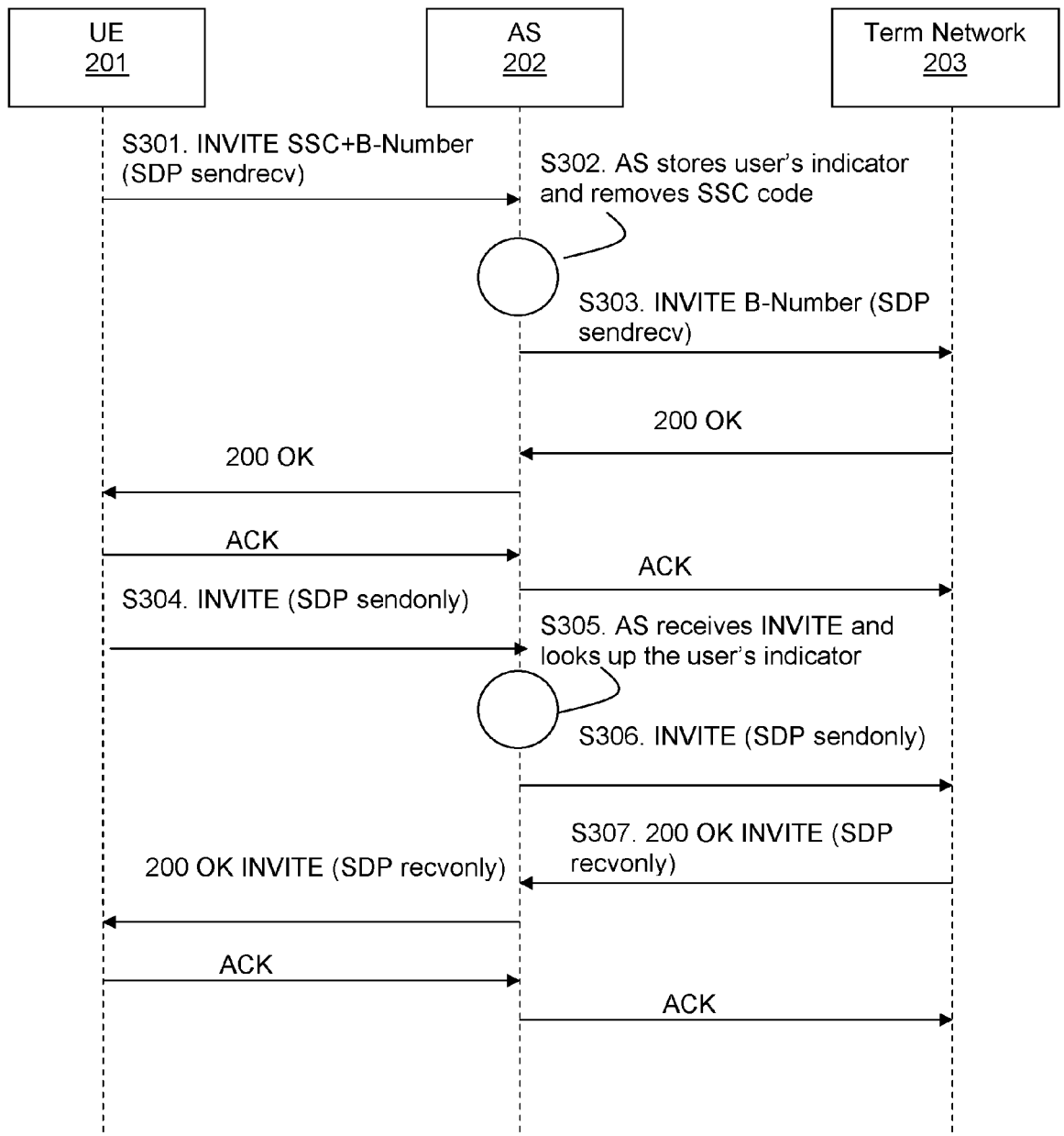
FIG. 3 is a signalling flow diagram illustrating a further exemplary way of configuring a HOLD announcement.

In a second embodiment, illustrated in FIG. 3, the HOLD announcement is configured by the UE 201 during initialisation of a communication session between the UE 201 and the other node 203, by utilisation an SIP based user configuration S301. The UE 201 supplies the AS 202 with a supplementary service code (SSC), also know as a feature access code (FAC). For example, the user can initiate a session with the other node 203 and affix an SSC to the front of the dialled number (B-number), wherein the SSC defines the user's setting.

S302. The AS 202 receives the INVITE sent towards the other node 203. The AS 202 stores the user's indicator, based on the SSC and removes the SSC prefix from the B-number.

S303. The AS 202 forwards the INVITE towards the other node 203. Further signalling to set up the session occurs between the other node 203, the AS 202 and the UE 201.

S304. During an established session the UE 201 makes a request to change the direction of the media stream by sending an INVITE towards the other node 203. The SDP message includes an "a=sendonly" attribute, corresponding to a request to change from "send and receive" to "send only."

S305. The AS 202 receives the INVITE associated with the request to change the direction of the media stream and looks up the user's indicator relating to whether a HOLD announcement is to be provided in the event of a change in the direction of the media stream.

S306. The AS 202 then forwards the INVITE on towards the other node 203. The AS can then provide or withhold a HOLD announcement to the other node, based on the contents of the indicator.

S307. Upon receiving the INVITE, the other node 203 sends a 200 OK response towards the UE 201 via the AS 202, the 200 OK response containing an SDP message requesting that the media stream be set to "receive only."

This embodiment allows the user to specify whether an announcement is to be provided during a session in which a change in the direction of the media stream occurs. The embodiment allows the user to configure their desired setting during the initialisation of the session by supplying the AS 202 with an SSC, where the SSC defines the user's setting.

In a third embodiment, supplementary service data is provided for the configuration of HOLD announcements. This allows the user to specify their setting regarding providing or withholding the HOLD announcement, prior to the initialisation of a session.

This embodiment introduces an XML schema for a HOLD supplementary service, which, in addition to specifying if the service is active or not, specifies if a network provided announcement shall be provided or not. By not providing a HOLD announcement, it is implied that unidirectional data shall be allowed end-to-end. An example of this XML schema is as follows:

```
<?xml version="1.0" encoding="UTF-8"?>
<xs:schema xmlns:ss="http://uri.etsi.org/ngn/params/xml/simservs/xcap"
xmlns:xs="http://www.w3.org/2001/XMLSchema"
targetNamespace="http://uri.etsi.org/ngn/params/xml/simservs/xcap"
elementFormDefault="qualified" attributeFormDefault="unqualified">
    <xs:element name="hold" substitutionGroup="ss:absService">
        <xs:annotation>
            <xs:documentation>Communication HOLD</xs:documentation>
        </xs:annotation>
        <xs:complexType>
            <xs:complexContent>
                <xs:extension base="ss:simservType">
                    <xs:sequence>
                        <xs:element name="default-behaviour" default="play-announcement" minOccurs="0">
                            <xs:simpleType>
                                <xs:restriction base="xs:string">
                                    <xs:enumeration value="play-announcement"/>
                                    <xs:enumeration value="play-no-announcement"/>
                                </xs:restriction>
                            </xs:simpleType>
                        </xs:element>
                    </xs:sequence>
                </xs:extension>
            </xs:complexContent>
        </xs:complexType>
    </xs:element>
</xs:schema>
```

An example of the UE specifying a desired setting for the HOLD supplementary service in the form of the XML part of a Ut request is as follows:

```
<?xml version="1.0" encoding="UTF-8"?>
<ss:simservs xmlns="http://uri.etsi.org/ngn/params/xml/simservs/xcap" >
    <ss:hold active="true">
        <ss:default-behaviour>play-no-announcement</ss:default-behaviour>
    </ss:hold>
</simservs>
```

If a user does not specify whether a HOLD announcement is to be provided or not, then their option may be set by the network operator.

This embodiment allows the user to specify whether an announcement is to be provided during a session in which a change in the direction of the media stream occurs. The embodiment allows the user to specify their desired setting before initialisation of the session by manipulating the configuration of their HOLD supplementary service at the AS 202.

Figure 4:
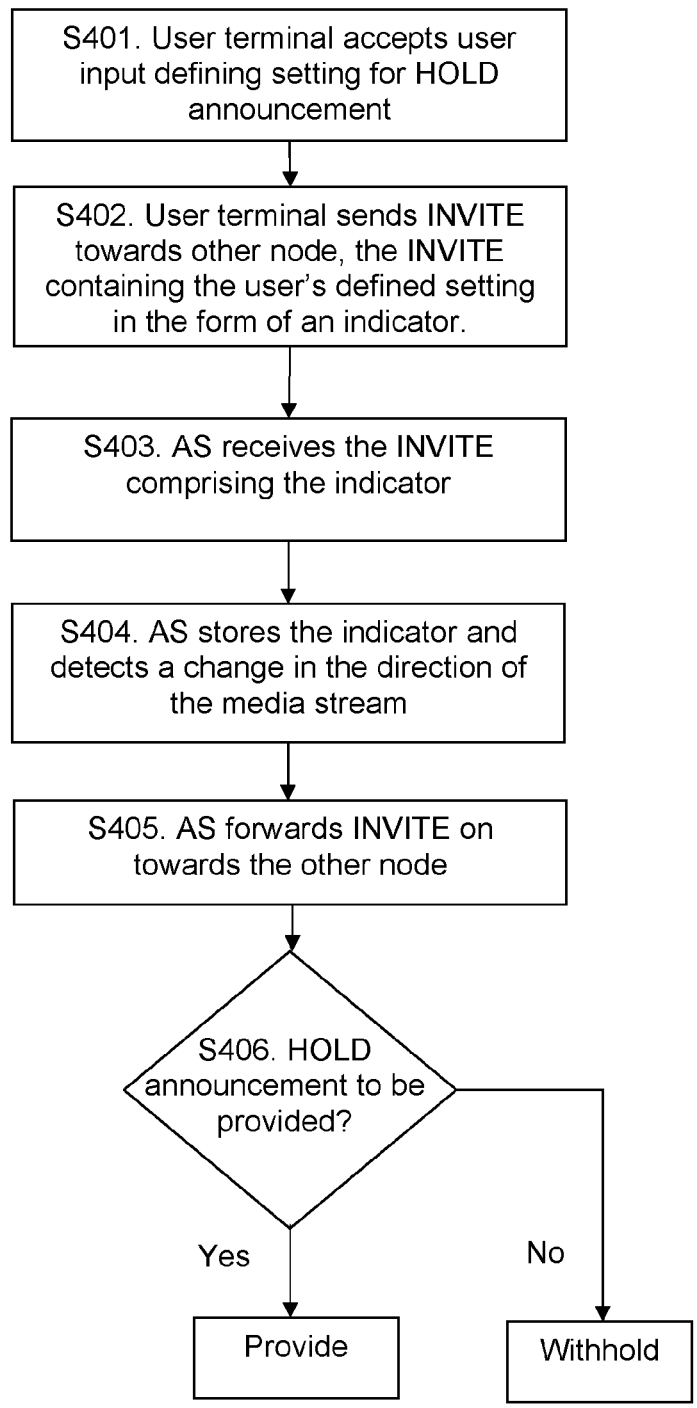
FIG. 4 is a flow diagram illustrating an exemplary embodiment of the invention.

FIG. 4 is a flow diagram illustrating an example of the process of the user configuration and implementation of a HOLD announcement in accordance with the first embodiment of the present invention. The steps are performed as follows:

S401 During an established session, a user, wishing to configuring the HOLD announcement, makes use of the user terminal 201 to input a desired setting regarding the condition for providing or withholding a HOLD announcement, in the form of an indicator.

S402 The user terminal 201 subsequently requests a change in the direction of the media stream, and sends an INVITE towards the other node 202. The SDP message sent with the INVITE comprises the indicator specifying whether a user associated with the user terminal 201 wishes the AS 202 to provide a HOLD announcement to the other node 203 when a change in the direction of the media stream is detected between the user terminal 201 and the other node 203.

S403 The AS 202 receives the INVITE, comprising the indicator from the user terminal.

S404 The AS 202 stores the indicator and detects a change in direction of the media stream.

S405 The AS 202 forwards the INVITE on towards the other node 203.

S406 The AS 202 looks up the indicator and implements the desired action accordingly.

While step S401 occurs during a session in this embodiment, it will be appreciated that the user may perform step S401 before the session has begun, with the user's setting being stored in a memory 703 in the UE.

Figure 5:
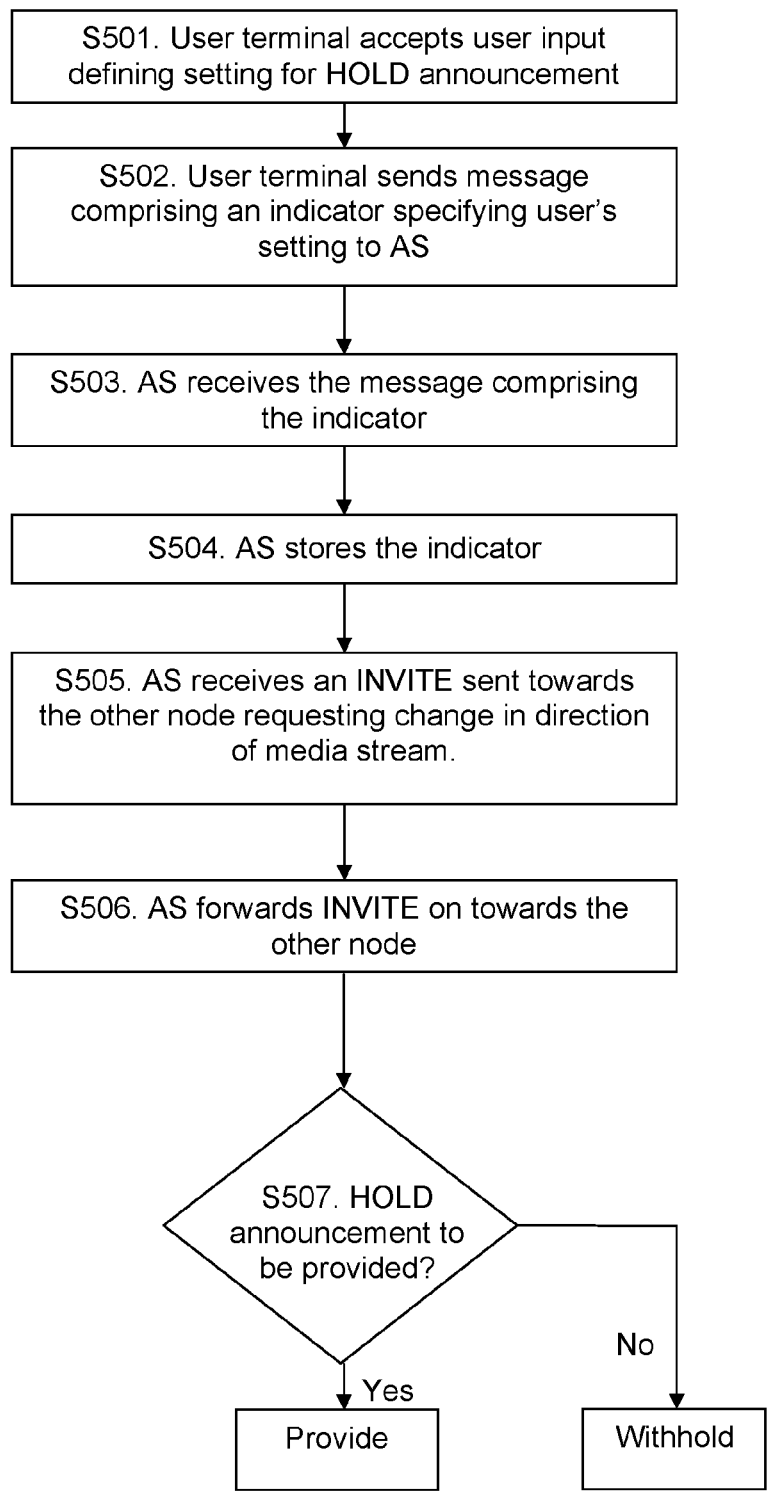
FIG. 5 is a flow diagram illustrating a further exemplary embodiment of the invention.

FIG. 5 is a flow diagram illustrating an example of the process of the user configuration and implementation of the HOLD announcement in accordance with the second and third embodiments of the present invention. The steps performed are as follows:

S501 A user who wants to configure the HOLD announcement makes use of a user terminal 201 to input a desired setting regarding the condition for providing or withholding a HOLD announcement, in the form of an indicator.

S502 The user terminal 201 then sends a message to the AS 202, the message comprising the indicator specifying whether a user associated with the user terminal 201 wishes the AS 202 to provide a HOLD announcement in the event of a change in direction of a media stream between the user terminal 201 and the other node 203 during a session.

S503 The AS 202 receives the message, comprising the indicator from the user terminal 201.

S504 The AS 202 stores the indicator.

S505 Subsequently during a session, the user requests that the direction of the media stream is to be changed and sends an INVITE request towards the other node 203. The INVITE request is received at the AS 202.

S506 The AS 202 forwards the INVITE on towards the other node.

S507 The AS 202 looks up the indicator in the memory 503 and implements the desired action accordingly.

Figure 6:
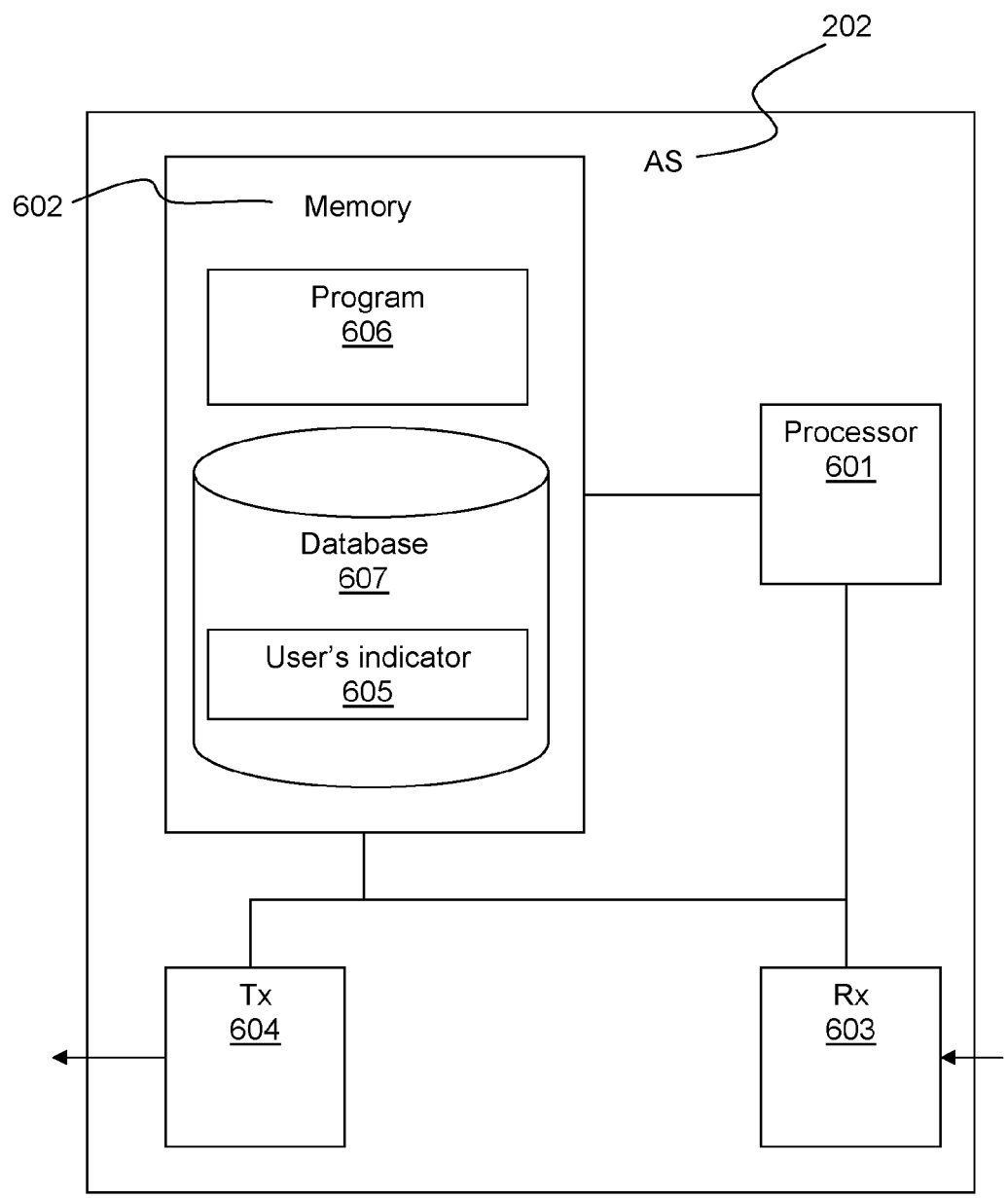
FIG. 6 illustrates schematically in a block diagram an exemplary embodiment of an Application Server.

FIG. 6 illustrates schematically an example of an AS 202 for implementing an IMS supplementary service in accordance with the methods described above. The AS 202 can be implemented as a combination of computer hardware and software. The AS 202 comprises a processor 601, a computer readable medium in the form of a memory 602 a receiver 603 and a transmitter 604. The memory 602 comprises a program 606 and a database 607 used for storing one or more user indicators 605. When the user terminal 201 requests that a change be made to the direction of the media steam between itself and the other node 203, an INVITE request is sent towards the other node 203 via the AS 202. This INVITE request is received by the receiver 603 at the AS 202 and the program 606 is implemented by the processor 601. The user's indicator 605, which is stored within the memory 602, is accessed and the user's desired setting is implemented based on the value of the indicator 605, as to whether the change in direction of the media stream should be accompanied by a HOLD announcement at the other node 203. The INVITE request is then sent on towards the other node 203 by the transmitter 604 and a HOLD announcement may be withheld or provided depending on the user's defined setting specified within the indicator.

Figure 7:
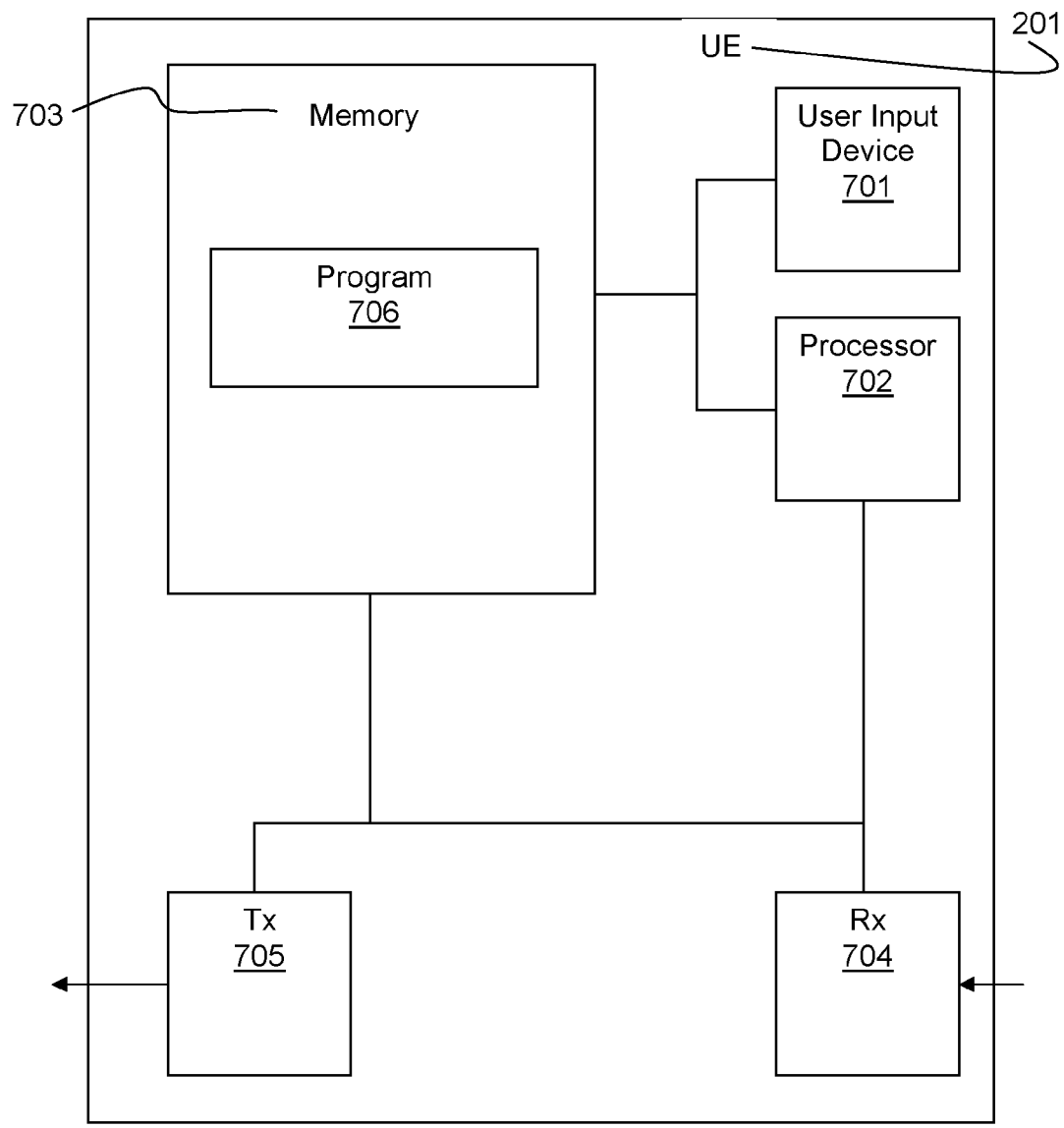
FIG. 7 illustrates schematically in a block diagram an exemplary embodiment of a User Equipment (UE).

FIG. 7 illustrates schematically an example of the UE 201 suitable for implementing the methods described above. The UE 201 can be implemented as a combination of computer hardware and software. The UE 201 comprises a user input device 701 a processor 702 a computer readable medium in the form of a memory 703 a receiver 704 and a transmitter 705. The memory 703 stores a program 706. The program 706 is implemented by the processor 702 and is used to process the user input received from the user input device 701. The processor 702 is used to generate a message, the message comprising an indicator 605 specifying whether a HOLD announcement is to be provided in the event of a change in the direction of the media stream between the UE 201 and the other node 203. The message is sent to the AS 202 by the transmitter 705.

It will be appreciated by the person of skill in the art that various modifications may be made to the above-described embodiments without departing from the scope of the present invention. For example, the above description refers to an IMS network, but it will be appreciated that the methods described may be implemented in other types of networks such as an internet protocol (IP) or Packet Switched (PS) network.

The following acronyms have been used in the above description:
3GPP 3rd Generation Partnership Project
AS Application Server
BGCFs Breakout Gateway Control Functions
CSCFs Call/Session Control Functions
FAC Feature Access Code
IMS IP Multimedia Subsystem
IP Internet Protocol
MRFCs Media Resource Function Controllers
PS Packet Switched
SDP Session Description Protocol
SIP Session Initiation Protocol
SSC Supplementary Service Code
SSD supplementary service data
UE User Equipment
XML Extensible Markup Language

The invention claimed is:

1. A method of managing a HOLD announcement in a communication network, the method comprising, at an Application Server (AS):
receiving from a user terminal a message, the message comprising an indicator specifying whether the AS should provide a HOLD announcement in an event of a change in direction of a media stream between the user terminal and a further node during a session;
storing the indicator in a memory;
determining that a change in direction of the media stream has occurred; and
determining, from the indicator, whether or not to provide the HOLD announcement to the further node.

2. The method as claimed in claim 1, wherein the communication network is an IP Multimedia Subsystem (IMS) network.

3. The method as claimed in claim 1, wherein the indicator is supplied to the AS using a Supplementary Service Code (SSC) at the start of the session.

4. The method as claimed in claim 1, wherein the indicator is supplied to the AS using an a-attribute in a Session Description Protocol (SDP) message.

5. The method as claimed in claim 1, wherein the indicator is supplied to the AS using supplementary service data (SSD).

6. The method as claimed in claim 1, wherein the change in the direction of the media stream is from a "send and receive" media stream, to a "send only" media stream.

7. An Application Server (AS), for managing a HOLD announcement in a communication network, the AS comprising:
a receiver for receiving from a user terminal a message, the message comprising an indicator specifying whether the AS should provide a HOLD announcement in an event of a change in direction of a media stream between the user terminal and a further node (203) during a session; and
a memory for storing the indicator; and
a processor for determining that a change in direction of the media stream has occurred, and;
the processor being further arranged to determine, from the indicator, whether or not to provide the HOLD announcement to the further node.

8. A method of operating a user terminal, the method comprising:
receiving a user input, the user input comprising an indicator specifying whether an Application Server (AS) should provide a HOLD announcement in an event of a change in direction of a media stream during a session involving the user terminal and a further node;
transmitting a first message comprising the indicator to the AS and a request to change in direction of the media stream; and receiving a second message from the AS indicating the further node acknowledging the request to change in direction of the media stream.

9. A user terminal comprising, a user input device for receiving a user input, the user input comprising an indicator specifying whether an Application Server (AS) should provide a HOLD announcement in an event of a change in direction of a media stream during a session involving the user terminal and a further node;

a transmitter for transmitting a first message comprising the indicator to the AS and a request to change in direction of the media stream; and a receiver for receiving a second message from the AS indicating the further node acknowledging the request to change in direction of the media stream.

10. A non-transitory computer readable medium storing a computer program, comprising computer readable code which, when run on an Application Server in a communication network, causes the Application Server to perform:

receiving from a user terminal a message, the message comprising an indicator specifying whether the AS should provide a HOLD announcement in an event of a change in direction of a media stream between the user terminal and a further node during a session;

storing the indicator in a memory;

determining that a change in direction of the media stream has occurred; and determining, from the indicator, whether or not to provide the HOLD announcement to the further node.

11. A non-transitory computer readable medium storing a computer program, comprising computer readable code which, when run on a user terminal, causes the user terminal to perform:

receiving a user input, the user input comprising an indicator specifying whether an Application Server (AS) should provide a HOLD announcement in an event of a change in direction of a media stream during a session involving the user terminal and a further node;

transmitting a first message comprising the indicator to the AS and a request to change in direction of the media stream; and receiving a second message from the AS indicating the further node acknowledging the event of the change in direction of the media stream.

12. The non-transitory computer readable medium of claim of claim 10, wherein the communication network is an IP Multimedia Subsystem (IMS) network.

13. The non-transitory computer readable medium of claim of claim 10, wherein the indicator is supplied to the AS using a Supplementary Service Code (SSC) at the start of the session.

14. The non-transitory computer readable medium of claim of claim 10, wherein the indicator is supplied to the AS using an a-attribute in a Session Description Protocol (SDP) message.

15. The non-transitory computer readable medium of claim of claim 10, wherein the indicator is supplied to the AS using supplementary service data (SSD).

16. The non-transitory computer readable medium of claim of claim 10, wherein the change in the direction of the media stream is from a "send and receive" media stream, to a "send only" media stream.

17. The method of claim 8, wherein the indicator is supplied to the AS using a Supplementary Service Code (SSC) at the start of the session.

18. The method of claim 8, wherein the indicator is supplied to the AS using an a-attribute in a Session Description Protocol (SDP) message.

19. A method of operating a user terminal, the method comprising:

receiving a user input, the user input comprising an indicator specifying whether an Application Server (AS) should provide a HOLD announcement in an event of a change in direction of a media stream during a session involving the user terminal and a further node;

transmitting a first message comprising the indicator to the AS;

transmitting a second message comprising a request to change in direction of the media stream; and receiving a third message from the AS indicating the further node acknowledging the request to change in direction of the media stream.

20. The method of claim 19, wherein the change in the direction of the media stream is from a "send and receive" media stream, to a "send only" media stream.

* * * * *